(12) United States Patent
Li et al.

(10) Patent No.: US 11,363,008 B2
(45) Date of Patent: *Jun. 14, 2022

(54) SYSTEM AND METHOD FOR APPLICATIONS TO SHARE SINGLE SIGN ON THROUGH LIGHTWEIGHT DIRECTORY ACCESS PROTOCOL (LDAP) INTEGRATION

(71) Applicant: Verizon Patent and Licensing Inc., Arlington, VA (US)

(72) Inventors: Minbao Li, Lewisville, TX (US); Doug Shock, Allen, TX (US); Steven L. Spak, Columbia, MD (US); Wei Liu, Flower Mound, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 400 days.

This patent is subject to a terminal disclaimer.

(21) Appl. No.: 16/693,818

(22) Filed: Nov. 25, 2019

(65) Prior Publication Data

US 2020/0092280 A1 Mar. 19, 2020

Related U.S. Application Data

(63) Continuation of application No. 15/491,655, filed on Apr. 19, 2017, now Pat. No. 10,523,655.

(51) Int. Cl.
*H04L 9/32* (2006.01)
*H04L 9/00* (2022.01)
*G06F 21/00* (2013.01)
*G06F 21/41* (2013.01)
*H04L 9/40* (2022.01)
*G06F 21/44* (2013.01)

(52) U.S. Cl.
CPC .......... *H04L 63/0815* (2013.01); *G06F 21/41* (2013.01); *G06F 21/44* (2013.01); *H04L 63/083* (2013.01)

(58) Field of Classification Search
CPC ............. G06F 21/33; G06F 21/335; G06F 21/44–445; H04L 63/08; H04L 63/0807; H04L 63/0823
See application file for complete search history.

(56) References Cited

U.S. PATENT DOCUMENTS

2005/0198036 A1 9/2005 Nedkov et al.

*Primary Examiner* — Alexander Lagor

(57) ABSTRACT

The techniques described herein may be used to provide a user with access to distinct applications (with Lightweight Directory Access Protocol (LDAP) authentication) based on a single set of user credentials from the user. A server may receive user credentials from a user device. The server may authenticate the user of the user device by communicating with an LDAP server. After the user has been authenticated, the server may detect a request from the user device to access a first application with LDAP authentication. The server may create temporary credentials for the user, provide the temporary credentials to the application, receive an authentication request (that includes the temporary credentials) from the application, and authenticate the user based on a local copy of the temporary credentials. If/when the user requests access to a second application, the server may authenticate the user for the second application in a similar manner.

20 Claims, 13 Drawing Sheets

Edit User Account Information

Permitted Applications

| | |
|---|---|
| ✓ | Application 1 |
| ✓ | Application 2 |
| ✓ | Application 3 |

Custom User Attributes of OpenStack

| Attribute Name | Default Value |
|---|---|
| CentralAccessCustomAlt | Test value |
| ... | ... |

| User | Central Access Permission | Application Permission |
|---|---|---|

[✓] Allow user to manage application

Fig. 10

SYSTEM AND METHOD FOR APPLICATIONS TO SHARE SINGLE SIGN ON THROUGH LIGHTWEIGHT DIRECTORY ACCESS PROTOCOL (LDAP) INTEGRATION

CROSS-REFERENCE TO RELATED APPLICATION

This Application is a Continuation of co-pending U.S. patent application Ser. No. 15/491,655, filed on Apr. 19, 2017, titled "SYSTEM AND METHOD FOR APPLICATIONS TO SHARE SINGLE SIGN ON THROUGH LIGHTWEIGHT DIRECTORY ACCESS PROTOCOL (LDAP) INTEGRATION," the contents of which are herein incorporated by reference in their entirety.

BACKGROUND

An organization (e.g., a business, a school, a research institution, etc.) may own, operate, or otherwise have access to a network that hosts applications (e.g., web applications) corresponding to different network services (e.g., a directory service, calendar and scheduling service, messaging service, storage service, billing and invoice service, accounting service, administration service, etc.). A user of the organization (e.g., an employee, student, etc.) may access an application on the network by providing credentials (e.g., a username and password) to the application. The application may use the credentials to authenticate the user and, upon successfully authenticating the user, provide the user with access to the application.

BRIEF DESCRIPTION OF THE DRAWINGS

Embodiments of the present disclosure will be readily understood by the following detailed description in conjunction with the accompanying drawings. To facilitate this description, like reference numerals may designate like structural elements. Embodiments of the disclosure are illustrated by way of example and not by way of limitation in the figures of the accompanying drawings.

FIG. 10 illustrates an example user interface for registering and managing user profiles with central access control server;

DETAILED DESCRIPTION OF PREFERRED EMBODIMENTS

Figure 1A:
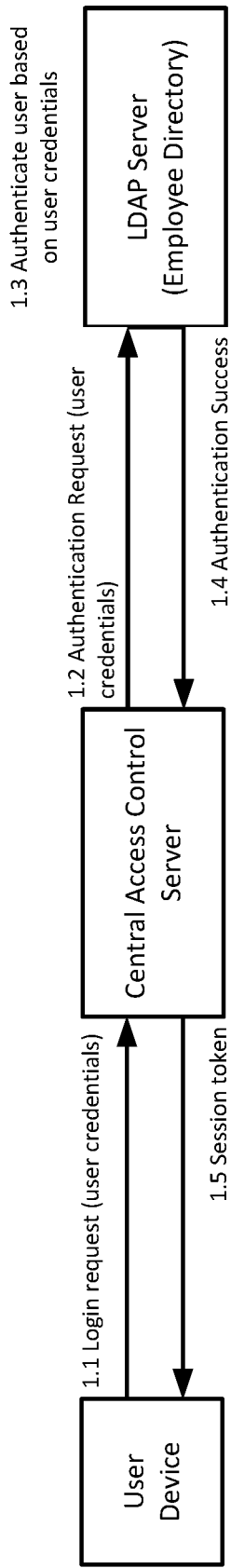
FIGS. 1A-1C illustrate an example overview of an embodiment described herein.

The following detailed description refers to the accompanying drawings. The same reference numbers in different drawings may identify the same or similar elements. It is to be understood that other embodiments may be utilized and structural or logical changes may be made without departing from the scope of the present disclosure. Therefore, the following detailed description is not to be taken in a limiting sense, and the scope of embodiments in accordance with the appended claims and their equivalents.

A network may include one or more server devices (e.g., application servers) that host applications configured to provide a particular service (e.g., a directory service, scheduling service, messaging service, accounting service, billing and invoice service, etc.). A user may access an application by operating a user device to provide the application with valid user credentials (e.g., a user name and password). The application may authenticate the user by providing the user credentials to an external device, such as an Active Directory (AD) server, a Lightweight Directory Access Protocol (LDAP) server, etc. If/when the user is successfully authenticated, the application may provide the user device with permission information (e.g., a cookie, a token, etc.) that may enable the user to access the application.

While a user may be permitted to access multiple applications, the network may not be capable of providing the user with access to the multiple applications based on receiving a single set of user credentials from the user (e.g., based on one single sign-on procedure involving the user). Instead, the user may be required submit his or her user credentials to each application on a separate and individual basis (i.e., one application at a time). This limitation may be due to the protocol that the applications use to obtain authentication services from an external device (e.g., an LDAP server, AD server, etc.).

For example, because of the wide-spread use of LDAP directories for authentication purposes, applications are often designed to use the LDAP protocol to communicate with an LDAP server to authenticate a user. However, the LDAP protocol does not support shared access control services, such as Single Sign-On (SSO). Therefore, when the user attempts to access an application that is configured to use the LDAP protocol for authenticating users, the user may be required to enter his or her user credentials regardless of whether the user has already been authenticated by another application, even if the other application also uses the LDAP protocol. As described herein, an application that uses the LDAP protocol for authentication (e.g., which does not support shared access control services, such as SSO) may be referred to as "an application with LDAP authentication."

The techniques described herein may be used to provide a user with access to multiple applications with LDAP authentication, based on a single set of user credentials from the user. Thus, the user may login to multiple applications with less time and effort, and network resources (e.g., processing capacity, memory capacity, network capacity, etc.) may be better conserved. The applications may be independent of one another and may reside on different application servers. For example, a user may operate a user device to provide user credentials (e.g., a username and password) to a central access control server. The central access control server may authenticate the user by providing, to an LDAP server, a request to authenticate the user credentials. The LDAP server may include a directory of user profiles (which may include valid credentials for each users), and the LDAP server may authenticate the user credentials from the central access control server based on the user profile information stored by the LDAP server.

After being authenticated by the central access control server, the user may request access to an application (e.g., an application with LDAP authentication) hosted by an application server or another type of server device. The central access control server may detect the request from the user and, in response, may create temporary user credentials (also referred to herein as "temporary credentials") for the user and provide the temporary credentials to the application for login purposes (e.g., for authentication and authorization). The central access control server may also store a local copy of the temporary credentials.

The application may authenticate the user by providing the temporary credentials to the central access control server. In this sense, the central access control server may be an "acting" LDAP server, and/or may be considered a proxy for an LDAP server, from the standpoint of the application. Thus, in lieu of a traditional LDAP server authenticating the login request on behalf of the application, the central access control server may authenticate the temporary credentials received from the application by comparing them to the local copy of the temporary credentials, and may inform the application that the user has been successfully authenticated. The application may proceed to create permission information (e.g., a cookie, a token, etc.) for the user and provide the permission information to the user device, thereby enabling the user device to access the application.

As such, the central access control server may automatically handle the application login process on behalf of the user by creating temporary login user credentials for the user, submitting the temporary credentials to the requested application, and authenticating the user credentials for the application. Additionally, when the user later requests access to a second application, the central access control server may handle the login process for the second application in a similar way. That is, the central access control server may create new temporary login user credentials for the user, submit the new temporary credentials to the requested application, and authenticate the new user credentials for the application. From the perspective of the user, therefore, once the user has been initially authenticated with the central access control server, the user may automatically access multiple applications without having to provide any additional user credentials, which would be necessary in typical LDAP-implemented authentication systems.

In some embodiments, user profiles may also be managed at the central access control server. For example, a network administrator may register a user with the central access control server. This may include creating a user profile (e.g., a name, job title, contact information, user credentials, etc.) and specifying applications for which the user is registered or is otherwise permitted to access. As such, when a user logs in to the central access control server, the central access control server may provide the user with an interface that includes his or her profile information and/or ways (e.g., links) for the user to access to a particular applications (e.g., without providing additional login details).

Applications may also be managed at the central access control server. A network administrator may register an application with the central access control server, which may include creating a profile for the application (e.g., an application name, application type, application ID, how to provide the application with temporary credentials, etc.) and specifying the types of user information that the application may be designed to use. Specifying the user information may enable applications to provide a user-specific version of the application (a version of the application with certain features, tools, options, content, etc.). For instance, if the application provides users with capability to manage a system, the type of user information that application might use could include a user organization, user title, user role or memberships, etc. As such, when the central access control server authenticates a user for the application, based on the profile of the application, the central access control server may provide the application with the user organization, user title, user role or memberships, etc., of the authenticated user, and application can use the user information to decide what features, tools, options, content, etc. the user will receive in the application.

Figure 1B:
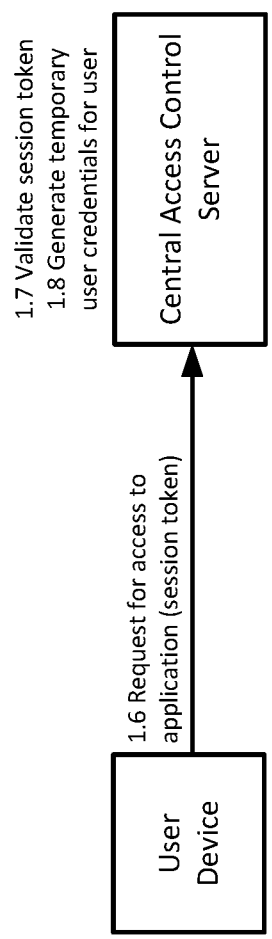
Figure 1C:
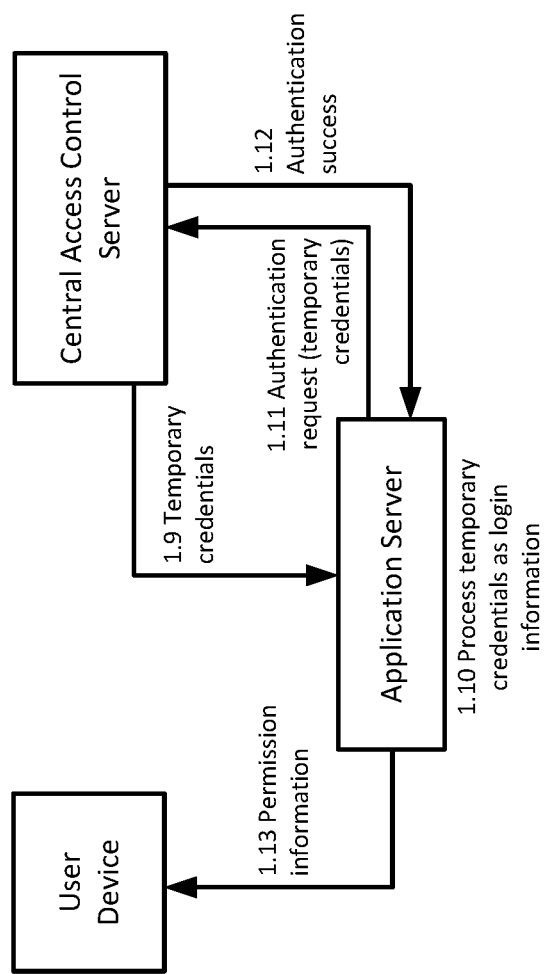

FIGS. 1A-1C illustrate an example of providing a user with access to multiple applications with LDAP authentication, without requiring the user to individually sign in to each application. As shown in FIG. 1A, a user device may send a login request to a central access control server (at 1.1). The request may be made based on, for example, a request by a user of the user device. The login request may include user credentials, such as a username and password of the user. In turn, the central access control server may send an authentication request (with the user credentials) to an LDAP server (at 1.2).

The LDAP server may include a user directory (e.g., an employee directory of a company) that includes user profiles and copies of valid user credentials. The LDAP server may authenticate the user by, for example, matching the user credentials from the central access control server to user credentials stored by the LDAP server (at 1.3). After the user has been authenticated, the LDAP server may notify the central access control server that the user has been authenticated (at 1.4), and in response, the central access control server may create a session token for the user and provide the session token to the user device (at 1.5).

Referring to FIG. 1B, the user device may provide a request to the central access control server for access to a particular application (at 1.6). The application may be available on a network server, such as an application server. The request may specify the particular application that the user would like to access and may include the session token provided to the user device by the central access control server. The central access control server may validate the token (at 1.7), which may include verifying that the user has been authenticated and/or that the communication session between the user device and the central access control server has not expired. The central access control server may also generate temporary credentials for the user (at 1.8) once the session token has been validated. Additionally, the central access control server may associate the temporary credentials with a user profile of the user and store a local copy of the temporary credentials.

As shown in FIG. 1C, the central access control server may provide a copy of the temporary credentials to the application server hosting the application requested by the user device (at 1.9). In some embodiments, the central access control server may also instruct the application server to request authentication, using the temporary credentials. In some embodiments, the application server may implement an Application Programming Interface ("API"), via which the central access control server can instruct the application server to request the authentication using the temporary credentials. In some embodiments, with the saved application profile and the application login request detail, central access control server may simulate user login request with the temporary credentials. In some embodiments, the application server may implement an Application Programming Interface ("API"), for example, to create a JavaScript function with predefined format and to include a JavaScript from central access control server in application's login page, via which the central access control server can instruct the application server to request the authentication using the temporary credentials.

The application may process the temporary credentials as login information (at 1.10), which may include providing an authentication request (with the temporary credentials) to the central access control server (at 1.11). The central access control server may authenticate the temporary credentials from the application based on the local copy stored by the central access control server previously. When the temporary credentials from the application match the local copy of the temporary credentials, the central access control server may inform the application that the user device has been successfully authenticated (at 1.12). In response, the application may create permission information for the user device (e.g., a cookie, a token, etc.) and provide the permission information to the user device (at 1.13). The user device may use the permission information to access the application.

Additionally, if/when the user device sends a request to access a second application (a request similar to the request at 1.6). The central access control server and the second application may perform a similar sequence of operations as those described above (at, for example, 1.7 through 1.13). For instance, the central access control server may validate the session token in the request, create a second set of temporary credentials for the user, and send the second set of temporary credentials to the second application. The application may process the second set of temporary credentials as login information, which may include sending the second set of credentials to the central access control server for authentication. In turn, the central access control server may authenticate the second set of credentials and inform the second application that the authentication was successful. The second application may then create permission information for accessing the second application and provide the permission information to the user device. As such, after the user has successfully logged in to the central access control server, the user may automatically access applications (with LDAP authentication) without having to resubmit his or her user credentials.

Figure 2:
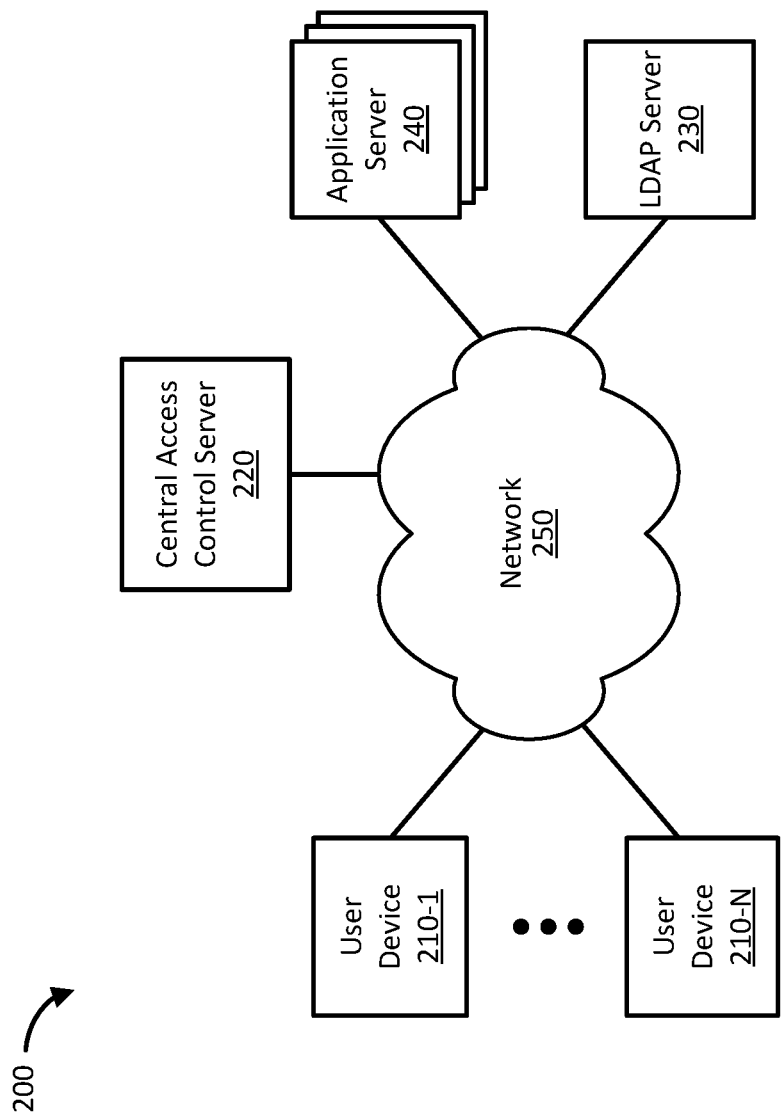
FIG. 2 illustrates an example environment in which systems and/or methods described herein may be implemented.

FIG. 2 is a diagram of an example environment 200 in which systems and/or methods described herein may be implemented. Environment 200 may include UE 210 (which may be referred to herein individually as "UE 210" or collectively as "UEs 210"), central access control server 220, LDAP server 230, one or more application servers 240 (which may be referred to herein individually as "application server 240" or collectively as "application servers 240"), and network 250.

The quantity of devices and/or networks, illustrated in FIG. 2, is provided for explanatory purposes only. In practice, environment 200 may include additional devices and/or networks; fewer devices and/or networks; different devices and/or networks; or differently arranged devices and/or networks than illustrated in FIG. 2. For example, while not shown, environment 200 may include devices that facilitate or enable communication between various components shown in environment 200, such as routers, modems, gateways, switches, hubs, etc. Alternatively, or additionally, one or more of the devices of environment 200 may perform one or more functions described as being performed by another device of environment 200. Additionally, the devices of environment 200 may interconnect with each other, and/or other devices, via wired connections, wireless connections, or a combination of wired and wireless connections. In some embodiments, one or more devices of environment 200 may be physically integrated in, and/or may be physically attached to, one or more other devices of environment 200. Also, while "direct" connections are shown in FIG. 2 between certain devices, some devices may communicate with each other via one or more additional devices and/or networks.

User device 210 may include a portable computing and communication device, such as a personal digital assistant (PDA), a smart phone, a cellular phone, a laptop computer with connectivity to network 250. User device 210 may connect to network 250 via a base station of a wireless telecommunication network, a Wi-Fi access point and Internet modem, etc. User device 210 may also include a non-portable computing device, such as a desktop computer, a consumer or business appliance, or another device that can connect to a radio access network (RAN) of the wireless telecommunications network. User device 210 may also include a computing and communication device that may be worn by a user (also referred to as a wearable device) such as a watch, a fitness band, a necklace, glasses, an eyeglass, a ring, a belt, a headset, or another type of wearable device.

Central access control server 220 may include one or more computing devices, such as a server device or a collection of server devices, capable of communicating with other devices (e.g., user device 210, LDAP server 230, and application servers 240) via network 250. Central access control server 220 may include an operating system and/or other software that enables central access control server 220 to perform one or more of the operations described herein. For example, central access control server 220 may receive and process login requests from user device 210, generate temporary login credentials for applications hosted by application servers 240, provide authentication servers for the applications of application servers 240, etc. In some embodiments, central access control server 220 may be implemented as an LDAP server, and/or a device that communicates according to an LDAP protocol, in the sense that requests from applications with LDAP authentication may send authentication requests (using the LDAP protocol) to central access control server 220, and central access control server 220 may authenticate and respond to the requests without communicating with LDAP server 230.

LDAP server 230 may include one or more computing devices, such as a server device or a collection of server devices, capable of communicating with other devices (e.g., central access control server 220) via network 250. LDAP server 230 may include a database of user information (e.g., name, address, contact information, etc.) corresponding to users of user devices 210. For example, LDAP server 230 may include a database of employees of a company, students of a school, or personnel of another type of organization. The information stored by LDAP server 230 may include a username and password for each user. In some embodiments, LDAP server 230 may be capable of communicating in accordance with the LDAP protocol and/or providing authentication services for external software and devices, such central access control server 230, application servers 240, etc. In some embodiments, LDAP server 230 may include AD or another type of user directory service.

Application servers 240 may include one or more computing devices, such as a server device or a collection of server devices, capable of communicating with other devices (e.g., user devices 210, central access control server 220, etc.) via network 250. Application servers 240 may include an operating system and/or other software that enable application servers 240 to host one or more software applications configured to provide a particular service, such as a messaging service, a calendar and scheduling service, a storage service, a billing service, an accounting service, an administration service, etc. Application servers 240 may be capable of receiving login requests from user devices 210, authenticate users based on an external authentication service (e.g., from central access control server 220), and provide permission information to users that are successfully authenticated.

Network 250 may include one or more wired and/or wireless networks. For example, network 250 may include a cellular network (e.g., a second generation (2G) network, a third generation (3G) network, a fourth generation (4G) network, a fifth generation (5G) network, a Long-Term Evolution (LTE) network, a global system for mobile (GSM) network, a code division multiple access (CDMA) network, an evolution-data optimized (EVDO) network, or the like), a public land mobile network (PLMN), and/or another network. Additionally, or alternatively, network 250 may include a local area network (LAN), a wireless LAN (WLAN), a wide area network (WAN), a metropolitan network (MAN), the Public Switched Telephone Network (PSTN), an ad hoc network, a managed Internet Protocol (IP) network, a virtual private network (VPN), an intranet, the Internet, a fiber optic-based network, and/or a combination of these or other types of networks.

Figure 3:
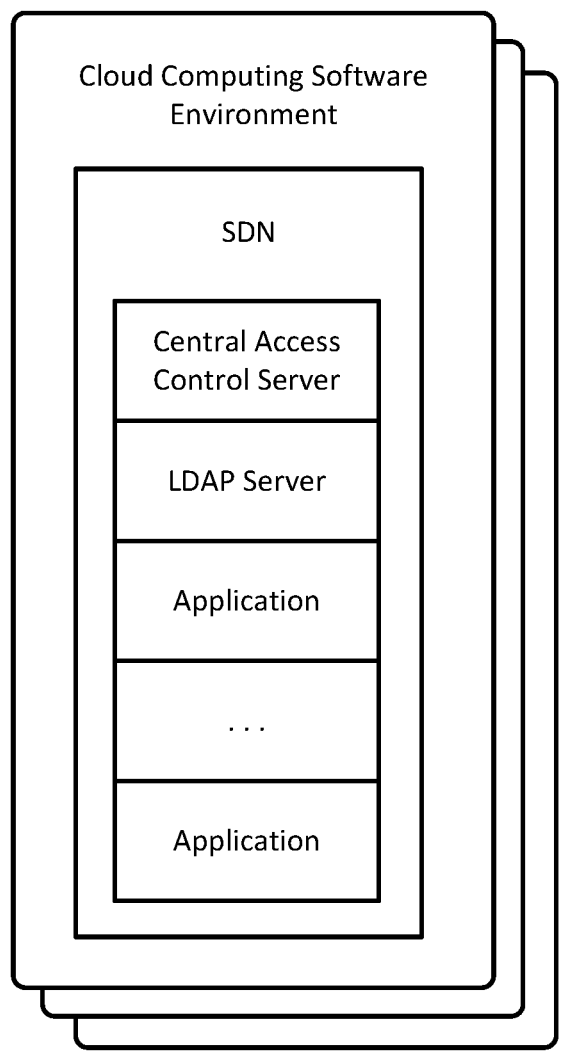
FIG. 3 illustrates an example of a cloud computing environment.

FIG. 3 is a diagram of an example of a cloud computing environment. The cloud computing environment may include a dynamic processing and storage environment distributed across a plurality of server devices. As shown, the cloud computing environment may include a Software Defined Network (SDN) with virtual versions of central access control server 220, an LDAP server 230, and applications of application servers 240, each of which may be implemented as a virtual network device, a virtual network function (VNF), or another type of virtual entity. The quantity of devices and/or functions, illustrated in FIG. 3, is provided for explanatory purposes only. In practice, a cloud computing environment may include additional devices and/or functions; fewer devices and/or functions; different devices and/or functions; or differently arranged devices and/or functions than illustrated in FIG. 3.

Figure 4:
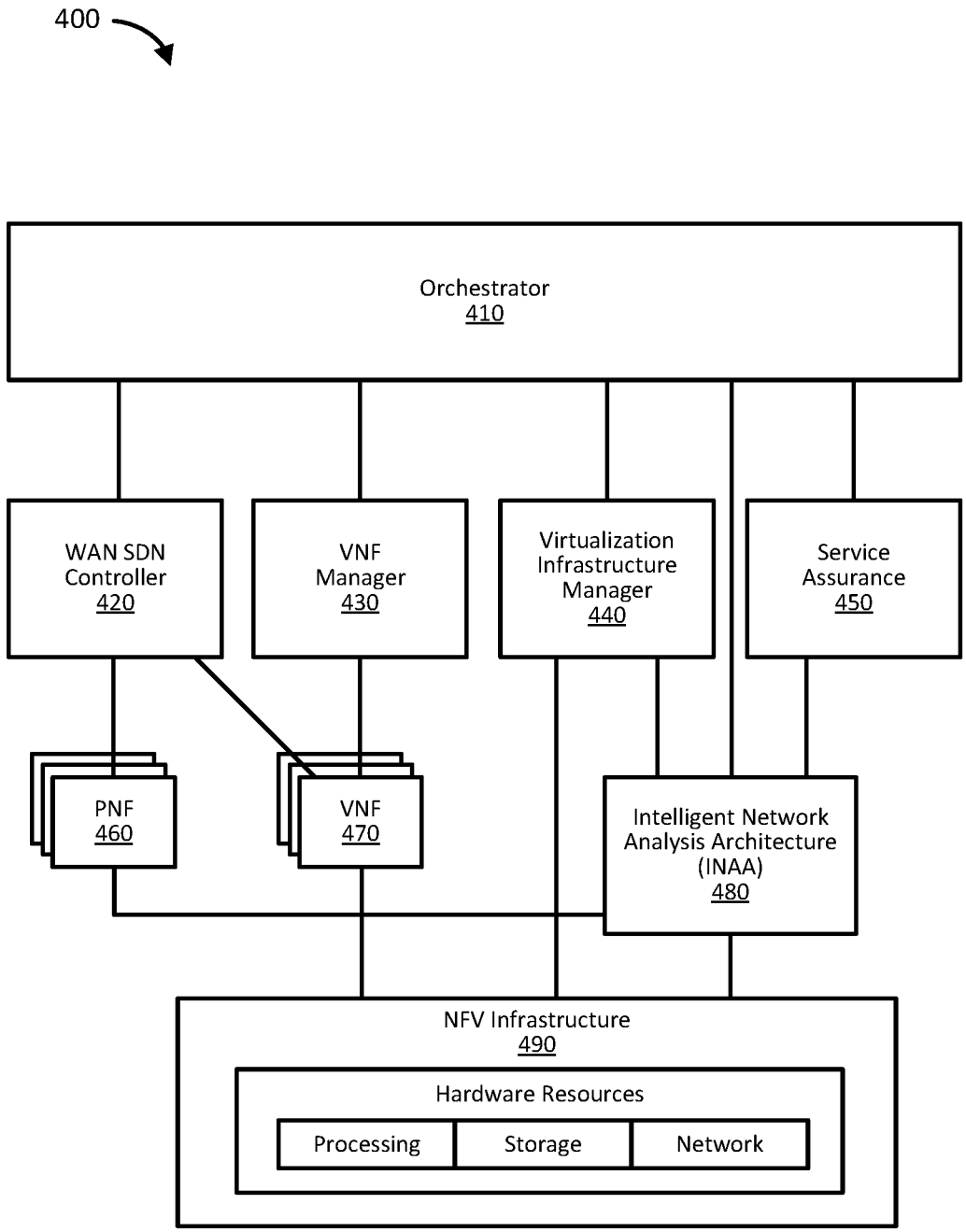
FIG. 4 illustrates an example of a virtual network that may be deployed across multiple, interconnected server devices.

FIG. 4 is a diagram of an example of a virtual network 400 that may be deployed across multiple, interconnected server devices. Virtual network 400 may be an example of a Software Defined Network (SDN). As described below, virtual network 400 may be virtualized embodiments of physical devices (e.g., a router, a hub, a server, a data storage device, etc.) or a function of a physical device (e.g., an authentication and authorization function, a user account management function, a customer billing function, etc.). In practice, types of virtual devices and/or virtual functions (also referred to herein as virtual network functions (VNFs)) implemented by virtual network 400 may vary.

As shown, virtual network 400 may include orchestrator 410, wide area network SDN (WAN SDN) controller 420, VNF manager 430, virtualization infrastructure manager 440, service assurance 450, physical network functions (PNFs) 460, virtual network functions 470, intelligent network analysis architecture (INAA) 480, and network function virtualization (NFV) infrastructure (NFVI) 490. Virtual network 400 may include a combination of virtualized functions (block 410-450 and 470-490) and physical devices (also referred to as PNFs 260). In some embodiments, the virtual functions may be implemented on one or more server devices 210 of a data center, while PNFs 260 may be implemented by one or more computing and/or communication devices (e.g., UE 210, central access control server 230, network device 320, operator device 330, etc.).

Orchestrator 410 may be responsible for allocating, instantiating, and activating network functions throughout virtual network 400. WAN SDN controller 420 may be responsible for control connectivity services in a WAN operated by example network 400. VNF manager 430 may be responsible for VNF lifecycle management, which may include instantiation of VNFs, upgrading VNFs, scaling for VNFs, terminating VNFs, etc. Virtualization infrastructure manager 440 may be responsible for allocating physical resources (e.g., processing capacity, memory capacity, storage capacity, etc.) to the embodiment of the virtualized functions of example network 400. In some embodiments, the physical resources managed by virtualization infrastructure manager 440 may include the physical resources of one or more server devices 210 of a data center.

Service assurance 450 may be responsible for collecting and monitoring data, which may include events, conditions, messages, performance levels, etc., of virtual network 400. The collected data may be used by one or more virtual functions of network 400. For example, as described in detail regarding FIGS. 6-8, the information collected and monitored by service assurance 450 may enable INAA 480 to determine faults within the network, determine appropriate corrections for the faults in the network, etc. PNF 460 may include a network function that may rely on dedicated hardware and software for part of its functionality. In some embodiments, PNFs 460, such as PNFs that correspond to enhanced Node Bs (eNBs) may be controlled by WAN SDNs 420 (as shown); however, other types of PNFs may be controlled by other types of devices and/or functions. In some embodiments, PNF 460 may include an eNB or another type of device through which UEs may connect to example network 400. In some embodiments, data from PNFs may be inputs to INAA 480.

VNFs 470 may include a software embodiment of a network device (and/or a function of a network device). Examples of VNFs 470 may include one or more devices of an EPC, such as SGW 330, PGW 340, MME 350, etc. INAA 480 may be responsible for identifying faults occurring within network 400, determining appropriate corrections to the faults, implementing the correction in order to remedy the fault, and more. In some embodiments, INAA 480 may receive information about the desired state of the network (e.g., information about how the network is intended to function). Doing so may, for example, enable INAA 480 to compare the actual or monitored state of the network with the desired state of the network, in order to develop ways (e.g., rules, policies, configurations, etc.) to improve the actual state of the network. NFVI 490 may include hardware (e.g., processors, memory, storage capacity, etc.) and software components (e.g., an operating system, applications for creating and managing VNFs, etc.) upon which the virtual functions of network 400 are deployed.

The quantity of physical and virtual components, illustrated in FIG. 4, is provided for explanatory purposes only. In practice, network 400 may include additional components, fewer components, different components, or differently arranged components than illustrated in FIG. 4. Alternatively, or additionally, one or more of the components of network 400 may perform one or more functions described as being performed by another component of network 400. In some embodiments, one or more components of network 400 may be physically (or virtually) integrated in, and/or may be physically (or virtually) attached to, one or more other components of network 400. Also, while "direct" connections are shown in FIG. 4 between certain components, some components may communicate with each other via one or more additional components.

Figure 5:
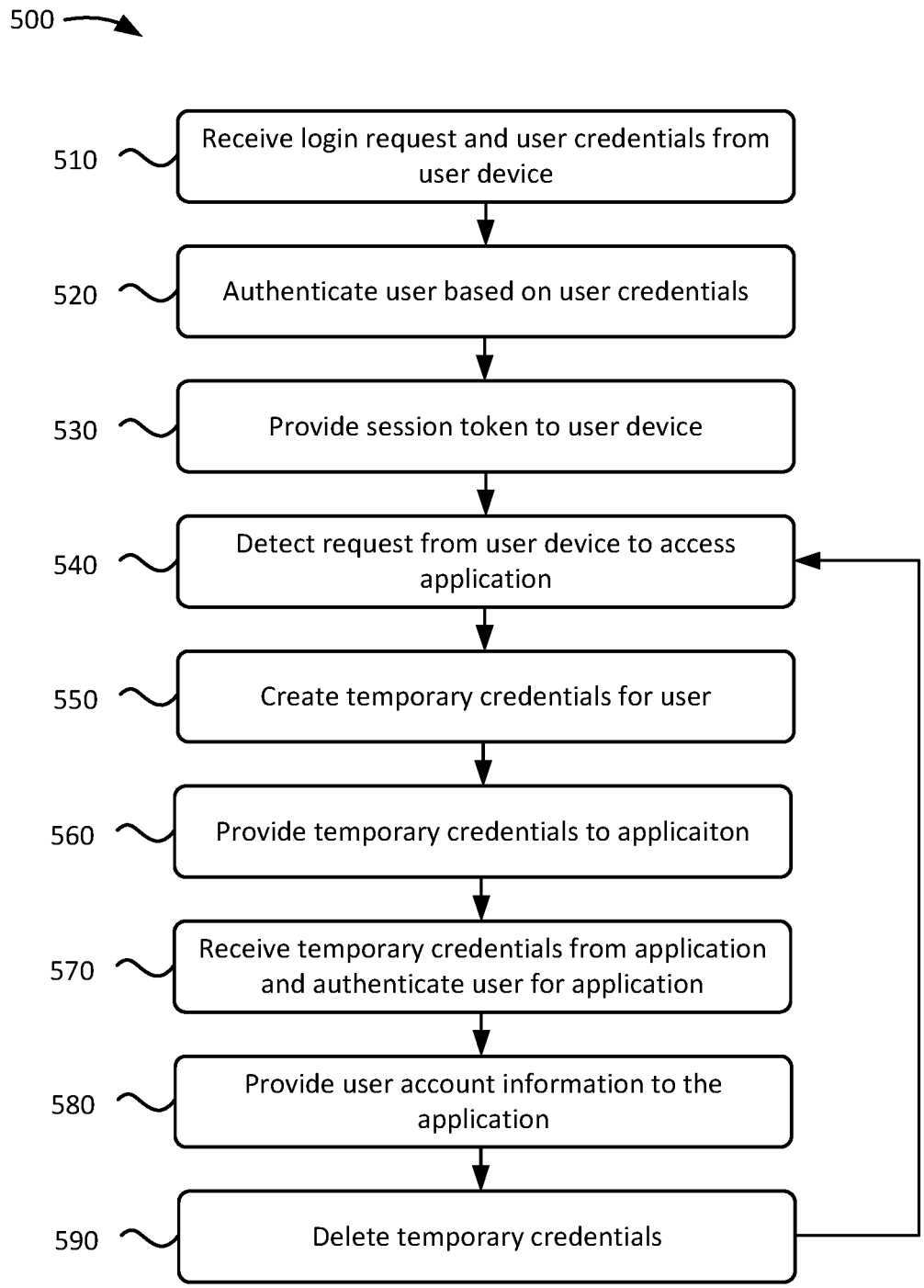
FIG. 5 illustrates an example process for providing a user with access to distinct applications (with Lightweight Directory Access Protocol (LDAP) authentication) based on a single set of user credentials from the user.

FIG. 5 is a diagram of an example process 500 for providing a user with access to distinct applications (with LDAP authentication) based on a single set of user credentials from the user. Process 500 may be performed by central access control server 220. The following description of FIG. 5 includes a general example of the techniques described herein. More detailed examples are discussed below regarding FIGS. 6 and 7.

As shown, process 500 may include receiving a login request and user credentials from user device 210 (block 510). For example, central access control server 220 may provide user device 210 with an interface (e.g., a web page) that enables a user of user device 210 to input user credentials (e.g., a user name and a password) and submit the user credentials as part of a login request. In some embodiments, the interface may be provided by another device (e.g., a web server) that may forward the logging request and the user credentials to central access control server 220.

Process 500 may also include authenticating the user based on the user credentials (block 520). For instance, in response to receiving a login request and user credentials from a user (e.g., via user device 210), central access control server 220 may authenticate the user by providing the user credentials to LDAP server 230. In some embodiments, certain users may be authenticated against LDAP server 230 while other users may be authenticated against a database that is local to central access control server 220. In such embodiments, when central access control server 220 receives a login request, central access control server 220 may determine whether the user credentials provided with the request are to be authenticated against LDAP server 230 or the local database. This determination may be based on, for example, the type of user credentials (e.g., an email address submitted as a user name) provided by user device 210. In some embodiments, the user and/or the user device may be authenticated using one or more other techniques in addition to, or in lieu of, the technique shown in blocks 510 and 520.

Process 500 may also include providing a session token to user device 210 (block 530). For example, in response to a successful authentication the user, central access control server 220 may provide user device 210 with a token. The token may indicate that the authentication was successful and/or that a user session (between user device 210 and central access control server 220) is currently active. In some implementations, the token may indicate a timeout value, indicating a time at which the token will become invalid, may indicate a duration for which the token will be valid, and/or may include other suitable information that indicates temporal restrictions on the validity of the token. The timer may include an inactivity timer whereby the token may become invalid if the session between user device 210 and central access control server 220 is inactive longer than a duration indicated by the token.

Figure 6:
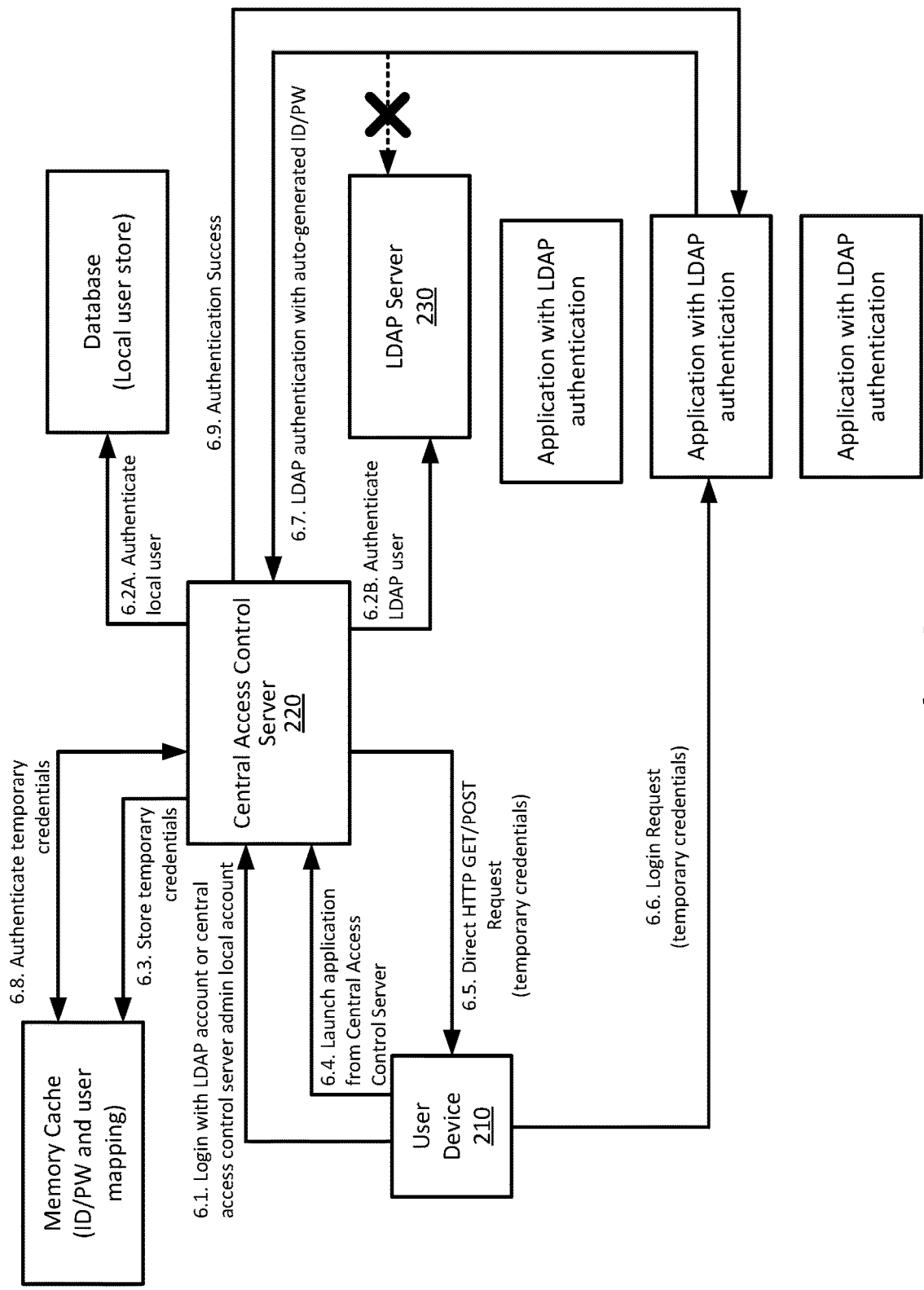
FIGS. 6 and 7 illustrate example embodiments of providing a user with access to an application (with LDAP authentication) based on a single set of user credentials from the user.
Figure 7:
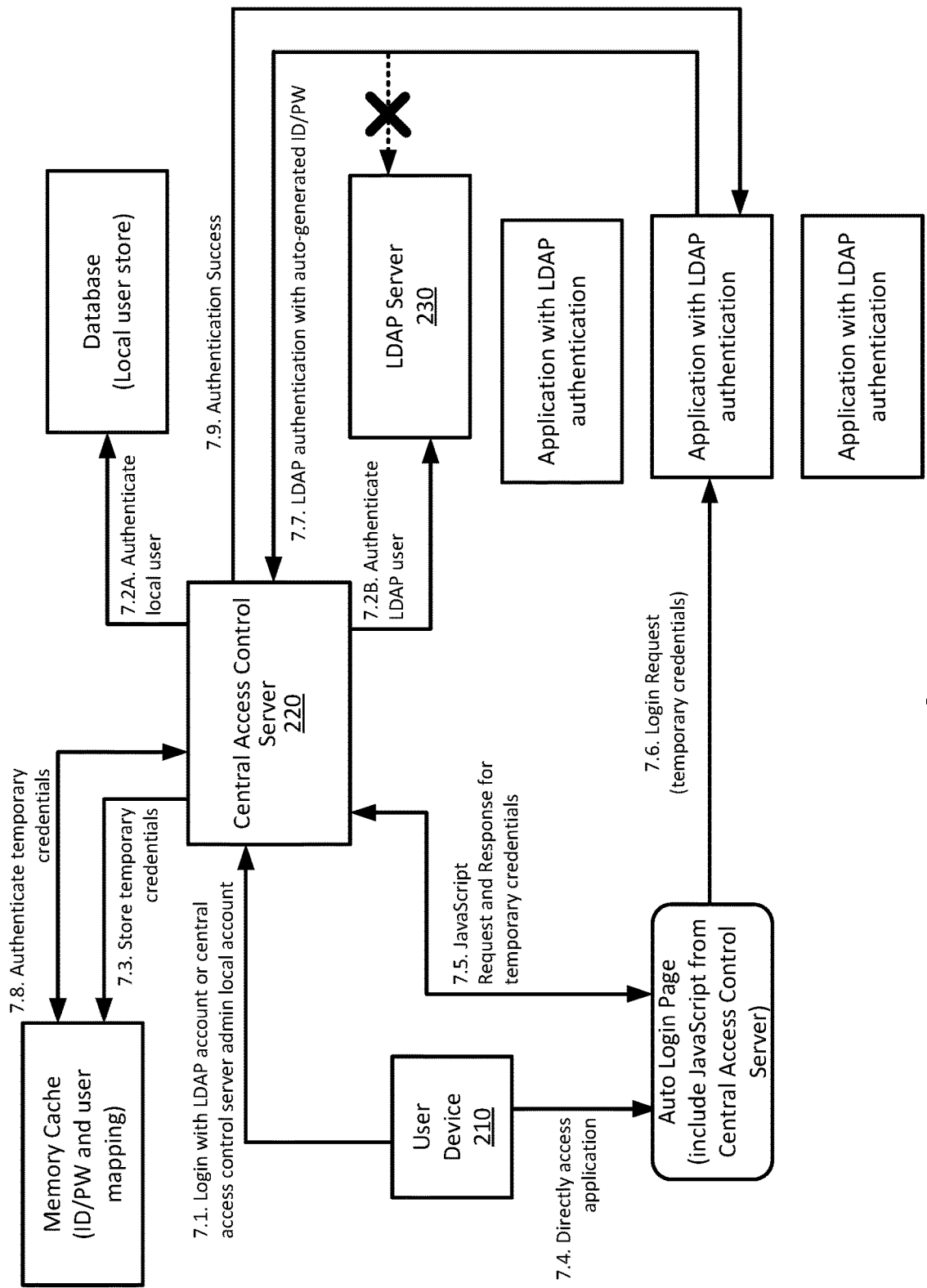

Process 500 may also include detecting a request, from user device 210, to access an application (block 540). For instance, central access control server 220 may detect a request, from user device 210, to access a particular application of application servers 240. The request may include the token received by user device 210, from central access control server 220, as a result of a successful authentication. The request may also include an application ID. The application ID may include a unique identifier of the application being requested. The application may be an application hosted by application servers 240. In some embodiments, central access control server 220 may detect the request based on an input, directly from user device 210, to central access control server 220 (e.g., a user selecting a link on a webpage provided by central access control server 220). In some embodiments, central access control server 220 may detect the request when user device initiates an executable and/or accesses a login webpage from the application. FIGS. 6 and 7 each provide an example of how central access control server 220 may detect a request, from user device 210, to access a particular application.

Process 500 may also include creating temporary credentials from the user (block 550). For example, central access control server 220 may create a set of temporary credentials (e.g., a user name and password) on behalf of the user of user device 210 and may associate the temporary credentials with a user profile of the user. The temporary credentials may conform to standards and/or restrictions associated with LDAP protocols, such as character limits or the like. The temporary credentials may include single-use credentials, such that the temporary credentials may only be used to login a user, to an application, one time. Additionally, or alternatively, the temporary credentials may include a duration for which the credentials may be valid.

Process 500 may also include providing the temporary credentials to the application (block 560). For instance, central access control server 220 may provide, on behalf of the user, the temporary credentials to the requested application. In some embodiments, central access control server 220 may provide the temporary credentials to the application by sending a Redirect message, along with the temporary credentials, to user device 210. In some embodiments, central access control server 220 may provide the temporary credentials to the application by providing the temporary credentials directly to an auto login webpage for the application. FIGS. 6 and 7 each provide more detailed examples of how central access control server 220 may provide the temporary credentials to the application.

Process 500 may also receive the temporary credentials from the application and authenticate the user for the application (block 570). For example, the application central access control server 220 may receive an authentication request, along with the temporary credentials, from the application. In response, central access control server 220 may authenticate the temporary credentials, by comparing the temporary credentials (from the application) with a copy of the temporary credentials stored by central access control server 220. When the credentials match, central access control server may respond to the request by indicating, to the application, that the authentication was successful, which may cause the application to generate permission information (e.g., a cookie, token, etc.) and provide the permission information to user device 210. If/when the credentials do not, central access control server 220 may respond by indicating that the authentication was not successful, which may cause the application to deny access to user device 210.

Process 500 may also include providing user account information to the application (block 580). For instance, central access control server 220 may determine the type of user information used by the application and may provide the user information that is specific for the application. In some embodiments, central access control server 220 may determine the type of user information used by the application based on information stored by central access control server 220 about the application. For example, before an application is made available to users, the application may be registered (e.g., by a network administrator) with central access control server 220. This may include providing central access control server 220 with a name, location information (e.g., a Uniform Resource Locator (URL)), etc., about the application. Additionally, information describing the types of user information used by the application (e.g., a user name, address, email address, telephone number, etc.) may also be provided (to central access control server 220) during the registration process. User information may be specific for the application only, and may be different than information in the user profile in the LDAP server—the user information can be either mapped with LDAP user profile with a different attribute name, or entered directly in central access control server for the particular user and the particular application. As such, when a user is authenticated to access an application, central access control server 220 may provide the application with the types of user information that the application may use for that user.

Process 500 may also include deleting the temporary credentials (block 590). For example, after a user is authenticated (by central access control server 220) for a particular application, central access control server 220 may delete the local copy of the temporary credentials. Deleting the temporary credentials may help manage memory and storage resources efficiently, in addition enabling the temporary credentials to be reused again (whether for the same user with respect to a different application or for a different user altogether). For example, as shown in FIG. 5, the user may request access to another application, which may prompt central access control server 220 to repeat one or more of the operations of process 500 (e.g., blocks 540-590).

FIG. 6 is a diagram of an example of providing a user with access to an application (with LDAP authentication) based on a single set of user credentials from the user. As shown, user device 210 may send a login request to central access control server 220, which may include providing user credentials (e.g., a username and password) (at 6.1) to central access control server 220. The user credentials may correspond to a local user account of central access control server 220 (e.g., an administrator account stored in a local database) or a remote user account (e.g., an employee account stored in an LDAP server).

Central access control server 220 may determine whether to authenticate the login request based on a local database (at 6.2A) or by communicating with another device, such as LDAP server 230 (at 6.2B). In some embodiments, central access control server 220 may determine how to authenticate the login request based on the user credentials provided by user device 210, based on an interface used by user device 210 to submit the user credentials, etc. In some embodiments, central access control server 220 may attempt to authenticate the login request by trial and error (e.g., by communicating with both the local database and LDAP server 230).

As shown, after the login request is authenticated, central access control server 220 may generate and store temporary credentials (for the authenticated user) in a local memory cache (at 6.3). The temporary credentials may include a username and password, and may be associated with a user profile of the authenticated user. At some point, user device 210 may provide central access control server 220 with a request to access (e.g., launch) a particular application (at 6.4). For example, after the user of user device 210 is successfully authenticated by central access control server 220, central access control server 220 may provide user device 210 with a webpage that includes links to applications that the user may access. In such a scenario, the user may request access to a particular application by selecting the link, provided in the webpage, associated with that application.

Central access control server 220 may respond to the request by communicating a direct Hypertext Transfer Protocol (HTTP) GET/POST request to user device 210 (at 6.5). The message from central access control server 220 may include a copy of the temporary credentials created for the user. In response, user device 210 may provide a login request to the application, along with the temporary credentials (at 6.6). The application receiving the login request may process the request by providing central access control server 220 with an authentication request, along with the copy of the temporary credentials (at 6.7). Central access control server 220 may authenticate the user by comparing the temporary credentials received from the application with a copy of the temporary credentials stored in the memory cache (at 6.8). Additionally, central access control server 220 may send a notification, to the application, that user credentials have been successfully authenticated (at 6.9). As described above with reference to FIG. 5, this notification may cause the application to generate and provide permission information to user device 210, which user device 210 may use to access the application.

FIG. 7 is a diagram of another example of providing a user with access to an application (with LDAP authentication) based on a single set of user credentials from the user. As shown, user device 210 may send a login request to central access control server 220, which may include providing user credentials (e.g., a username and password) (at 7.1) to central access control server 220. The user credentials may correspond to a local user account of central access control server 220 (e.g., an administrator account stored in a local database) or a remote user account (e.g., an employee account stored in an LDAP server).

Central access control server 220 may determine whether to authenticate the login request based on a local database (at 7.2A) or by communicating with another device, such as LDAP server 230 (at 7.2B). In some embodiments, central access control server 220 may determine how to authenticate the login request based on the user credentials provided by user device 210, based on an interface used by user device 210 to submit the user credentials, etc. In some embodiments, central access control server may attempt to authenticate the login request by trial and error (e.g., by communicating with both the local database and LDAP server 230).

As shown, after the login request is authenticated, central access control server 220 may generate and store temporary credentials, for the authenticated user, in a local memory cache (at 7.3). The temporary credentials may include a username and password, and may be associated with a user profile of the authenticated user. At some point after the user of user device 210 has been authenticated, user device 210 may attempt to directly access an application (at 7.4). In some embodiments, this may include the user initiating an executable stored on user device 210, accessing a login webpage for a particular application, etc. In such embodiments, the login interface may include internal logic (e.g., JavaScript or the like) that may cause the login interface to contact central access control server 220 regarding the attempt by the user to access a particular application. In such a scenario, the interface may provide central access control server 220 with the token (or another type of information) that notifies central access control server that a previously authenticated user device 210 is attempting to access an application. In response, central access control server 220 may provide the temporary credentials created for the user so that user device 210 may login to the application (at 7.5 and 7.6).

The application receiving the login request may process the request by providing central access control server 220 with an authentication request, along with the copy of the temporary credentials (at 7.7). Central access control server 220 may authenticate the user by compare the temporary credentials received from the application with a copy of the temporary credentials stored in the memory cache (at 7.8). Additionally, central access control server 220 may send a notification, to the application, that user credentials have been successfully authenticated (at 7.9). As described above with reference to FIG. 5, this notification may cause the application to generate and provide permission information to user device 210, which user device 210 may use to access the application.

Figure 8:
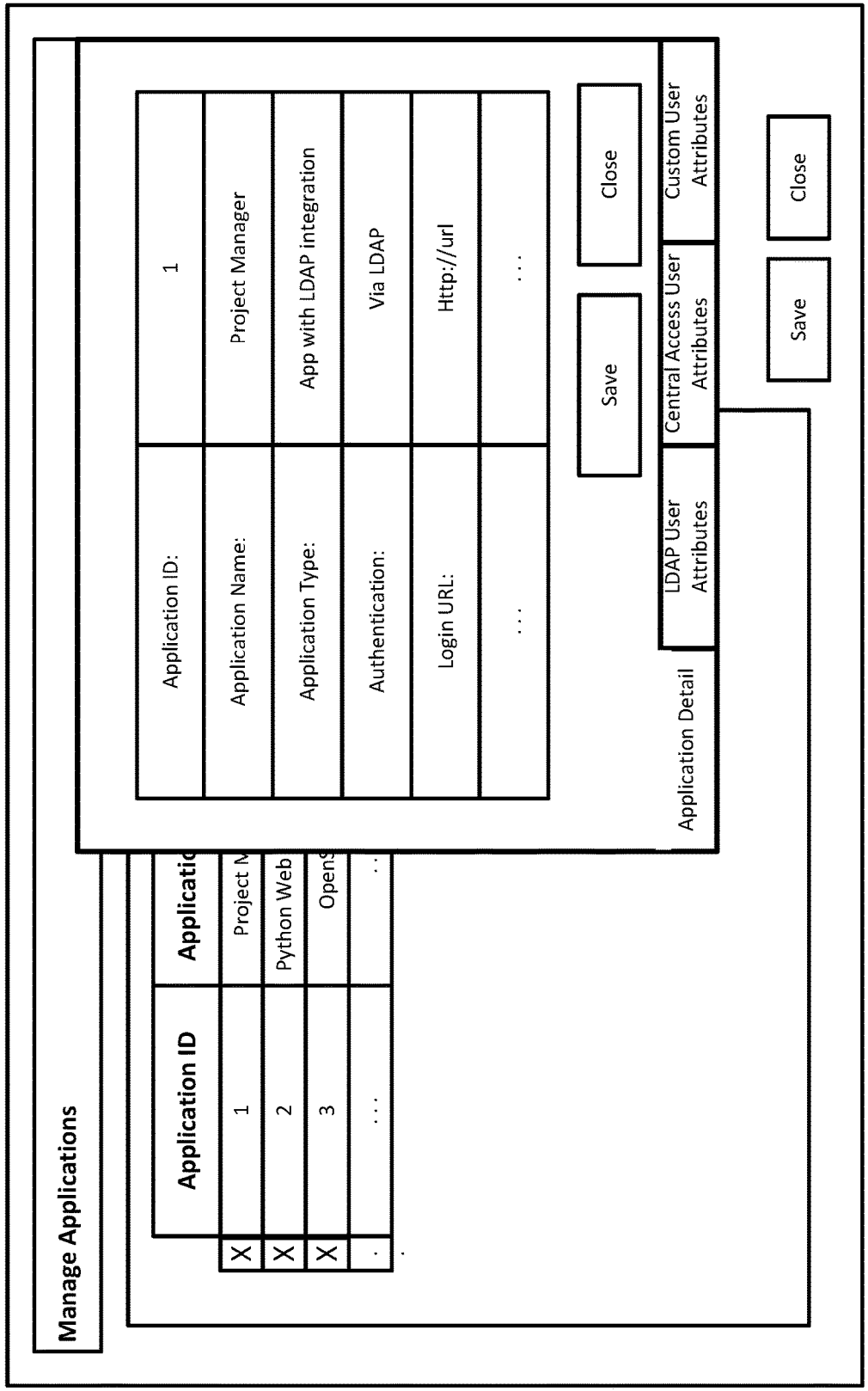
FIGS. 8 and 9 illustrate example user interfaces for registering and managing applications with central access control server.
Figure 9:
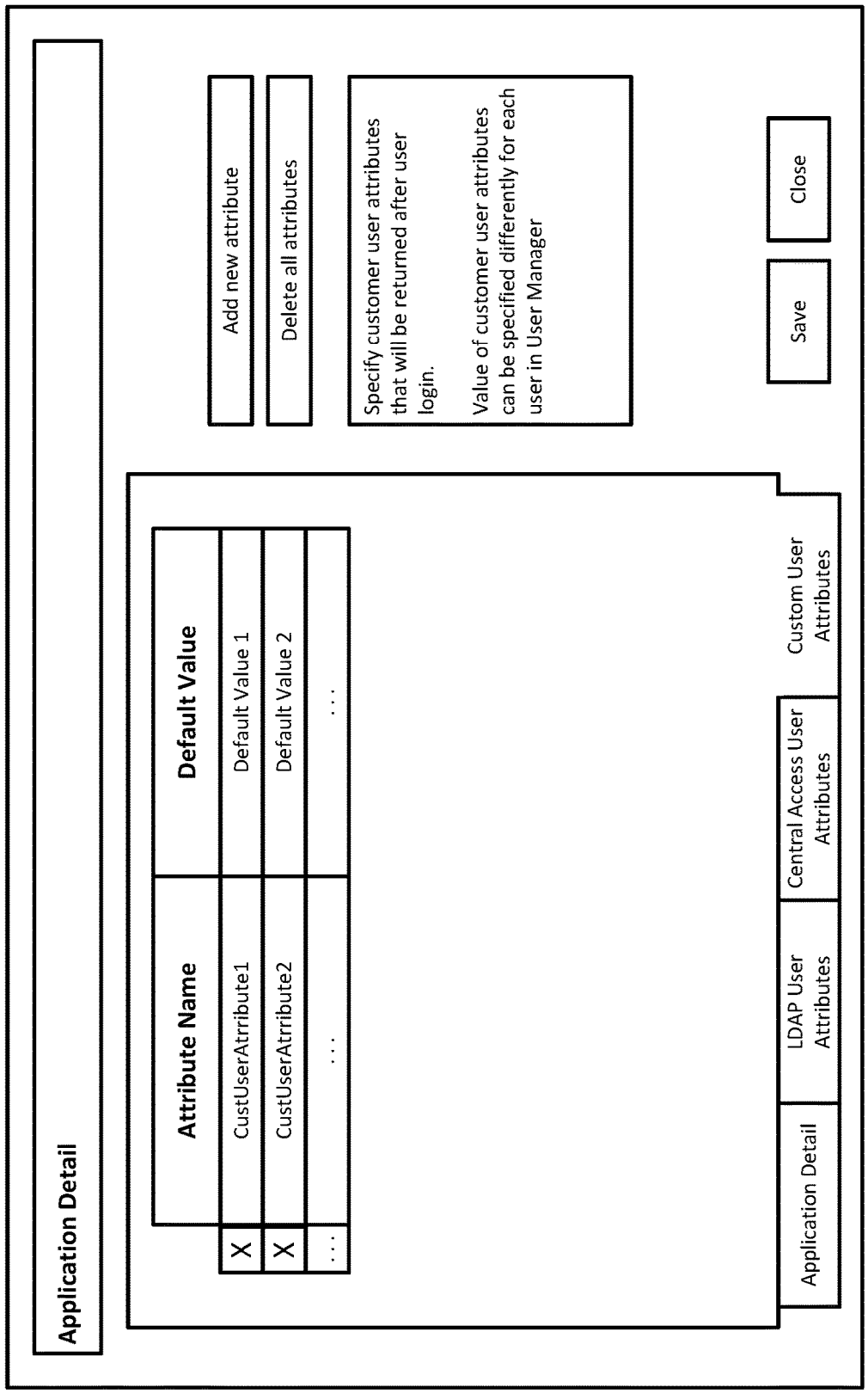

FIGS. 8 and 9 are diagrams of an example user interface for registering and managing applications with central access control server 220. A user (e.g., a network administrator) may login to central access control server 220 in order access a user interface whereby the user may register a new application for authentication services. The user may register the application with central access control server 220 by creating an application profile, which may include inputting certain attributes about the application. As shown in FIG. 8, such attributes may include an Application Name, Application Type, an Authentication Type, a location (e.g., a URL) where the application may be accessed, how to provide temporary credentials to the application (via HTTP GET/POST), parameters determining the parameters for the temporary credentials, etc. Registering the application with central access control server 220 may enable central access control server 220 to provide the authentication services, as described herein, for the application.

Referring to FIG. 9, the user may also specify the types of user information that is pertinent to the application. For instance, a messaging application may use a name, email address, account number, etc., to provide the user with a functional and/or customized messaging interface. As such, central access control server 220 may enable a network administrator to specify the types of user information that may be used by the application. In turn, this may enable central access control server 220 to provide the relevant user information to the application in response to a successful authentication of the user for the application.

As shown in FIG. 9, the user registering the application may specify the user information in accordance with the manner and location where the user information is stored (e.g., LDAP server 230, a local database, etc.). This feature may be of particular use since, for example, LDAP server 230 and a local database may store similar types of information (e.g., a user's name) under different tags or titles (e.g., LDAP server 230 may store a user's name as "USERNAME" while a local database may store the user's name as "First Name" and "Last Name"). As shown in FIG. 9, central access control server 220 may enable a network administrator to create custom attributes (with default values) that may be provided to, and used by, an application. For example, if a particular application uses a type of user information (e.g., a job title) that is not available from LDAP server 230 or the local database, the user information (e.g., attribute name) and/or a default value may be specified. This may help ensure that, for example, the application operates properly even when central access control server 220 is unable to provide the types of user information required by the application (e.g., because some of the types of user information is simply not stored by LDAP server 230 or a local database).

FIG. 10 is a diagram of an example user interface for registering and managing user profiles with central access control server 220. A user (e.g., a network administrator) may login to central access control server 220 in order access a user interface whereby user profiles may be associated with particular applications. As such, when a user is successfully authenticated by central access control server 220 (see, e.g., block 520 of FIG. 5), central access control server 220 may determine the applications that are associated with the newly authenticated user and provide an interface (e.g., a webpage) with buttons, links, etc., to the applications that the user may access.

Additionally, or alternatively, associating a user profile with particular applications may enable central access control server 220 to provide an additional level of security when a user attempts to access an application. For example, when central access control server 220 detects a request from a user for access to a particular application (see, e.g., block 540 of FIG. 5), central access control server 220 may verify whether the user is permitted to access the application by comparing the requested application to the applications associated with the user's profile. When the requested application is associated with the user's profile, central access control server 220 may proceed with providing the authentication services discussed herein (e.g., by creating temporary credentials, providing the temporary credentials to the application, etc.). When the requested application is not associated with the user's profile, central access control server 220 may notify the user that he or she is not authorized to access the application.

Figure 11:
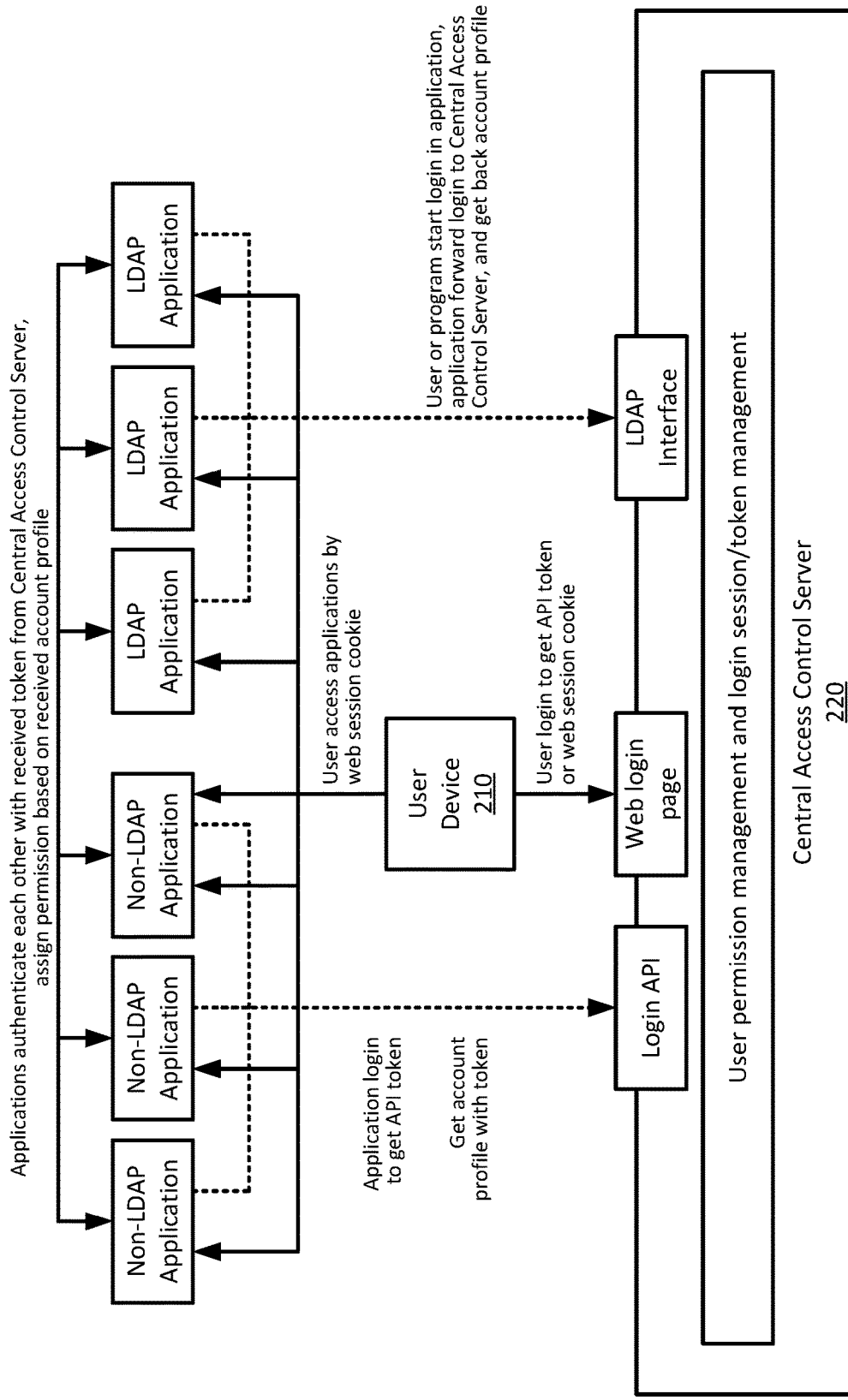
FIG. 11 illustrates an example of a network architecture for user authentication services described herein.

FIG. 11 is a diagram of an example of a network architecture for the user authentication services described herein. As shown, the network architecture may include user device 210, central access control server 220, LDAP server 230, LDAP applications (i.e., applications with LDAP authentication), and non-LDAP applications (i.e., application that perform user authentication without using LDAP). The network architecture of FIG. 11 provides an example of how central access control server 220 may provide user authentication services to applications configured for LDAP authentication and non-LDAP authentication.

User device 210 may provide central access control server 220 with a login request that includes user credentials (e.g., a username and password for the user). Central access control server 220 may authenticate based on user information stored in a local database or by communicating with LDAP server 230. After being authenticated, user device 210 may receive session information (e.g., a session token, cookie, etc.) from central access control server 220, which the user may later use when accessing one or more applications.

When user device 210 requests access to a non-LDAP application, central access control server 220 may detect the request and verify (based on the session information given to user device 210) that the session for user device 220 is still active (e.g., hasn't expired yet), Additionally, as described herein, central access control server 220 may create temporary credentials for the user of user device 210, associate the temporary credentials with the user profile of the user, and provide a login request with the temporary credentials to the application (on behalf of the user). The LDAP application may forward the temporary credentials to central access control server 220, and central access control server 220 may authenticate the temporary credentials (based on a locally stored copy of the temporary credentials) and provide whatever user information may be pertinent to the LDAP application.

When user device 210 requests access to a non-LDAP application, user device 210 may provide the application with the session information (e.g., the session token, cookie, etc.) that user device 210 previously received from central access control server 220. The non-LDAP application may respond to the request by communicating with central access control server 220 via an Application Protocol Interface (API). The non-LDAP application may provide the session information to central access control server 220, and central access control server 220 may verify that the session is valid and still active. Central access control server 220 may use the session information to identify a user profile of the user and provide the non-LDAP application with pertinent user information.

Figure 12:
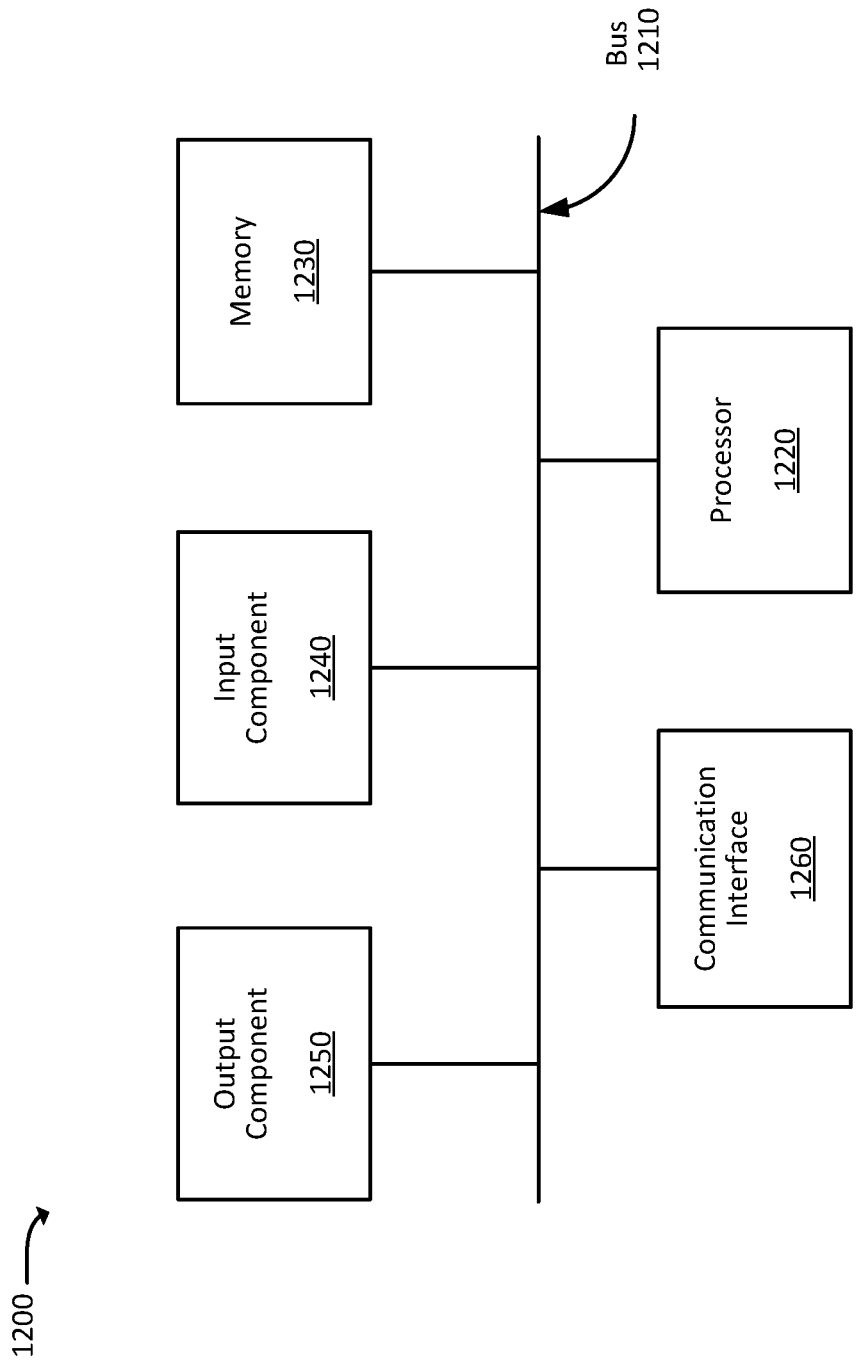
FIG. 12 is a block diagram of example components of a device.

FIG. 12 is a diagram of example components of a device 1200. Each of the devices illustrated in FIGS. 1A-2, 6, 7, and 11 may include one or more devices 1200. Device 1200 may include bus 1210, processor 1220, memory 1230, input component 1240, output component 1250, and communication interface 1260. In another embodiment, device 1200 may include additional, fewer, different, or differently arranged components. As described herein, a component may be implemented by hardware circuitry, software logic, and/or some combination thereof.

Bus 1210 may include one or more communication paths that permit communication among the components of device 1200. Processor 1220 may include a processor, microprocessor, or processing logic that may interpret and execute instructions. Memory 1230 may include any type of dynamic storage device that may store information and instructions for execution by processor 1220, and/or any type of non-volatile storage device that may store information for use by processor 1220.

Input component 1240 may include a mechanism that permits an operator to input information to device 1200, such as a keyboard, a keypad, a button, a switch, etc. Output component 1250 may include a mechanism that outputs information to the operator, such as a display, a speaker, one or more light emitting diodes (LEDs), etc.

Communication interface 1260 may include any transceiver-like mechanism that enables device 1200 to communicate with other devices and/or systems. For example, communication interface 1260 may include an Ethernet interface, an optical interface, a coaxial interface, or the like. Communication interface 1260 may include a wireless communication device, such as an infrared (IR) receiver, a cellular radio, a Bluetooth radio, or the like. The wireless communication device may be coupled to an external device, such as a remote control, a wireless keyboard, a mobile telephone, etc. In some embodiments, device 1200 may include more than one communication interface 1260. For instance, device 1200 may include an optical interface and an Ethernet interface.

Device 1200 may perform certain operations described above. Device 1200 may perform these operations in response to processor 1220 executing software instructions stored in a computer-readable medium, such as memory 1230. A computer-readable medium may be defined as a non-transitory memory device. A memory device may include space within a single physical memory device or spread across multiple physical memory devices. The software instructions may be read into memory 1230 from another computer-readable medium or from another device. The software instructions stored in memory 1230 may cause processor 1220 to perform processes described herein. Alternatively, hardwired circuitry may be used in place of or in combination with software instructions to implement processes described herein. Thus, embodiments described herein are not limited to any specific combination of hardware circuitry and software.

In the preceding specification, various preferred embodiments have been described with reference to the accompanying drawings. It will, however, be evident that various modifications and changes may be made thereto, and additional embodiments may be implemented, without departing from the broader scope set forth in the claims that follow. The specification and drawings are accordingly to be regarded in an illustrative rather than restrictive sense.

For example, while a series of lines, arrows, and/or blocks have been described regarding FIGS. 1A-1C, 5-7, and 11 the order of the blocks and arrangement of the lines and/or arrows may be modified in other embodiments. Further, non-dependent blocks may be performed in parallel. Similarly, while series of communications have been described with regard to several of the Figures provided herein, the order or nature of the communications may potentially be modified in other embodiments.

It will be apparent that example aspects, as described above, may be implemented in many different forms of software, firmware, and hardware in the embodiments illustrated in the figures. The actual software code or specialized control hardware used to implement these aspects should not be construed as limiting. Thus, the operations and behaviors of the aspects that were described without reference to the specific software code—it being understood that software and control hardware could be designed to implement the aspects based on the description herein.

Further, certain portions may be implemented as "logic" that performs one or more functions. This logic may include hardware, such as an application-specific integrated circuit (ASIC) or a field-programmable gate array (FPGA), or a combination of hardware and software.

To the extent the aforementioned embodiments collect, store or employ personal information provided by individuals, it should be understood that such information shall be used in accordance with all applicable laws concerning protection" of personal information. Additionally, the collection, storage and use of such information may be subject to consent of the individual to such activity, for example, through well-known "opt-in" or "opt-out" processes as may be appropriate for the situation and type of information. Storage and use of personal information may be in an appropriately secure manner reflective of the type of information, for example, through various encryption and anonymization techniques for particularly sensitive information.

Even though particular combinations of features are recited in the claims and/or disclosed in the specification, these combinations are not intended to be limiting. In fact, many of these features may be combined in ways not specifically recited in the claims and/or disclosed in the specification.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or,"

as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A device, comprising:
a memory storing a plurality of processor-executable instructions; and
one or more processors configured to execute the processor-executable instructions, wherein executing the processor-executable instructions causes the one or more processors to:
provide a token to a user device based on authenticating the user device;
receive a first request to access a first application, the first request being based on a Lightweight Directory Access Protocol (LDAP) authentication procedure and including the token;
create, based on receiving the first request to access the first application, a set of temporary credentials;
provide the set of temporary credentials to the user device, wherein the user device provides the set of temporary credentials to one or more devices that implement the first application;
receive the set of temporary credentials from the one or more devices that implement the first application;
authenticate the first request to access the first application based on the token included in the first request, wherein authenticating the first request further includes verifying that the received set of temporary credentials match the created set of temporary credentials;
identify a first subset of information, out of a set of information associated with the user device, for which the first application is authorized to access;
provide the first subset of information to the authenticated first application;
receive a second request to access a second application, the second request being based on the LDAP authentication procedure and including the token and a second identifier of the second application;
authenticate the second request to access the second application based on the token included in the second request;
identify a second subset of information, out of the set of information associated with the user device, for which the first application is authorized to access; and
provide the second subset of information to the authenticated second application.

2. The device of claim 1, wherein the one or more processors are further configured to:
receive correlation information correlating different application identifiers to different subsets of the set of information associated with the user device,
wherein the first request includes an identifier of the first application, wherein identifying that the first application is authorized to access the first subset of information includes identifying that the correlation information correlates the first application identifier to the first subset of information associated with the user device, and
wherein the second request includes an identifier of the second application, wherein identifying that the second application is authorized to access the second subset of information includes identifying that the correlation information correlates the second application identifier to the second subset of information associated with the user device.

3. The device of claim 1, wherein providing the first subset of information to the first application includes forgoing providing other information, of the set of information associated with the user device, to the first application.

4. The device of claim 1, wherein authenticating the user device is performed based on a particular set of authentication credentials associated with the user device, and wherein authenticating the first and second requests is performed without using the particular set of authentication credentials associated with the user device.

5. The device of claim 1, wherein the set of temporary credentials is provided to the user device via a redirect message.

6. The device of claim 1, wherein the one or more processors are further configured to:
notify the first application that the user device has been authenticated for accessing the first application; and
delete the created set of temporary credentials based on authenticating the first request to access the first application.

7. The device of claim 1, wherein the created set of temporary credentials are a first set of temporary credentials, wherein authenticating the second request is based on using a different second set of temporary credentials.

8. A method, comprising:
providing a token to a user device based on authenticating the user device;
receiving a first request to access a first application, the first request being based on a Lightweight Directory Access Protocol (LDAP) authentication procedure and including the token;
creating, based on receiving the first request to access the first application, a set of temporary credentials;
providing the set of temporary credentials to the user device, wherein the user device provides the set of temporary credentials to one or more devices that implement the first application;
receiving the set of temporary credentials from the one or more devices that implement the first application;
authenticating the first request to access the first application based on the token included in the first request, wherein authenticating the first request further includes verifying that the received set of temporary credentials match the created set of temporary credentials;
identifying a first subset of information, out of a set of information associated with the user device, for which the first application is authorized to access;
providing the first subset of information to the authenticated first application;
receiving a second request to access a second application, the second request being based on the LDAP authentication procedure and including the token and a second identifier of the second application;
authenticating the second request to access the second application based on the token included in the second request;
identifying a second subset of information, out of the set of information associated with the user device, for which the first application is authorized to access; and
providing the second subset of information to the authenticated second application.

9. The method of claim 8, further comprising:
storing correlation information correlating different application identifiers to different subsets of the set of information associated with the user device,
wherein the first request includes an identifier of the first application, wherein identifying that the first application is authorized to access the first subset of information includes identifying that the correlation information correlates the first application identifier to the first subset of information associated with the user device, and
wherein the second request includes an identifier of the second application, wherein identifying that the second application is authorized to access the second subset of information includes identifying that the correlation information correlates the second application identifier to the second subset of information associated with the user device.

10. The method of claim 8, wherein providing the first subset of information to the first application includes forgoing providing other information, of the set of information associated with the user device, to the first application.

11. The method of claim 8, wherein authenticating the user device is performed based on a particular set of authentication credentials associated with the user device, and wherein authenticating the first and second requests is performed without using the particular set of authentication credentials associated with the user device.

12. The method of claim 8, further comprising:
notifying the first application that the user device has been authenticated for accessing the first application; and
deleting the set of temporary credentials based on authenticating the first request to access the first application.

13. The method of claim 8, wherein the created set of temporary credentials are a first set of temporary credentials, wherein authenticating the second request is based on using a different second set of temporary credentials.

14. The method of claim 8, wherein the set of temporary credentials is provided to the user device via a redirect message.

15. A non-transitory computer-readable medium, storing a plurality of processor-executable instructions to:
provide a token to a user device based on authenticating the user device;
receive a first request to access a first application, the first request being based on a Lightweight Directory Access Protocol (LDAP) authentication procedure and including the token;
create, based on receiving the first request to access the first application, a set of temporary credentials;
provide the set of temporary credentials to the user device, wherein the user device provides the set of temporary credentials to one or more devices that implement the first application;
receive the set of temporary credentials from the one or more devices that implement the first application;
authenticate the first request to access the first application based on the token included in the first request, wherein authenticating the first request further includes verifying that the received set of temporary credentials match the created set of temporary credentials;
identify a first subset of information, out of a set of information associated with the user device, for which the first application is authorized to access;
provide the first subset of information to the authenticated first application;
receive a second request to access a second application, the second request being based on the LDAP authentication procedure and including the token and a second identifier of the second application;
authenticate the second request to access the second application based on the token included in the second request;
identify a second subset of information, out of the set of information associated with the user device, for which the first application is authorized to access; and
provide the second subset of information to the authenticated second application.

16. The non-transitory computer-readable medium of claim 15, further comprising processor-executable instructions to:
store correlation information correlating different application identifiers to different subsets of the set of information associated with the user device,
wherein the first request includes an identifier of the first application, wherein identifying that the first application is authorized to access the first subset of information includes identifying that the correlation information correlates the first application identifier to the first subset of information associated with the user device, and
wherein the second request includes an identifier of the second application, wherein identifying that the second application is authorized to access the second subset of information includes identifying that the correlation information correlates the second application identifier to the second subset of information associated with the user device.

17. The non-transitory computer-readable medium of claim 15, wherein providing the first subset of information to the first application includes forgoing providing other information, of the set of information associated with the user device, to the first application.

18. The non-transitory computer-readable medium of claim 15, wherein authenticating the user device is performed based on a particular set of authentication credentials associated with the user device, and wherein authenticating the first and second requests is performed without using the particular set of authentication credentials associated with the user device.

19. The non-transitory computer-readable medium of claim 15, wherein the processor-executable instructions further include processor-executable instructions to:
notify the first application that the user device has been authenticated for accessing the first application; and
delete the created set of temporary credentials based on authenticating the first request to access the first application.

20. The non-transitory computer-readable medium of claim 15, wherein the created set of temporary credentials are a first set of temporary credentials, wherein authenticating the second request is based on using a different second set of temporary credentials.

* * * * *